SENSING AND SYNCHRONIZING FACSIMILE MEANS

Filed Feb. 6, 1961

2 Sheets-Sheet 1

INVENTORS
MICHAEL FISHER
ANTHONY J. BASEIL
BY
[signature]
ATTORNEY

INVENTORS
MICHAEL FISHER
ANTHONY J. BASEIL
BY Eugene S. Lovelle
ATTORNEY 3,068,318

SENSING AND SYNCHRONIZING FACSIMILE MEANS

Michael Fisher, South Orange, and Anthony J. Baseil, Pompton Lakes, N.J., assignors to Woodland Electronics Co., Inc., New York, N.Y., a corporation of Delaware Filed Feb. 6, 1961, Ser. No. 87,320
8 Claims. (Cl. 178—6.6)

This invention relates to facsimile apparatus and, in particular, a system capable of sensing printed information constituted by conductive markings at a transmitter unit and for conducting such information over a transmission line, such as a telephone line, to a receiver unit remotely located from the transmitter for reproducing a copy of such printed information at the receiver unit and also includes means for synchronizing the operation of facsimile components at the transmitter and receiver units so that true and accurate copy of the printed information is recorded at the receiver unit.

It is the principal object of the invention to provide facsimile apparatus which is adaptable to sense printed information constituted by relatively conductive or special dielectric material at a transmitter unit and to impress same over a transmission line, such as a telephone line, to a receiver unit which may be remotely located from the transmitter in order to reproduce a true and accurate copy of the printed information at the receiver unit.

It is a further object of the invention to employ oscillator means which normally provides an audio beat frequency signal in accordance with sensing of the printed information, which beat frequency signal is sensed by a gating circuit so as to load an audio frequency oscillator to create an "on-off" signal depending upon the presence or absence of the beat frequency signal so that there is a correspondence between sensing of the printed information and the on or off of the audio signal, which is transmitted over the transmission line to a receiver unit for conversion to actuating a receiver stylus for recording like information at the receiver.

It is a principal object of the invention to synchronize the sensing of the information at the transmitter with recording of the copy information at the receiver and, in particular, the use of cylindrical drums which are simultaneously rotated and caused to travel axially in synchronism so that each drum starts and stops and undergoes its cycle of travel in unison as a copy of the printed information is being sensed in the transmitter unit and copy thereof is being recorded in the receiver unit.

Figures 1, 1A:
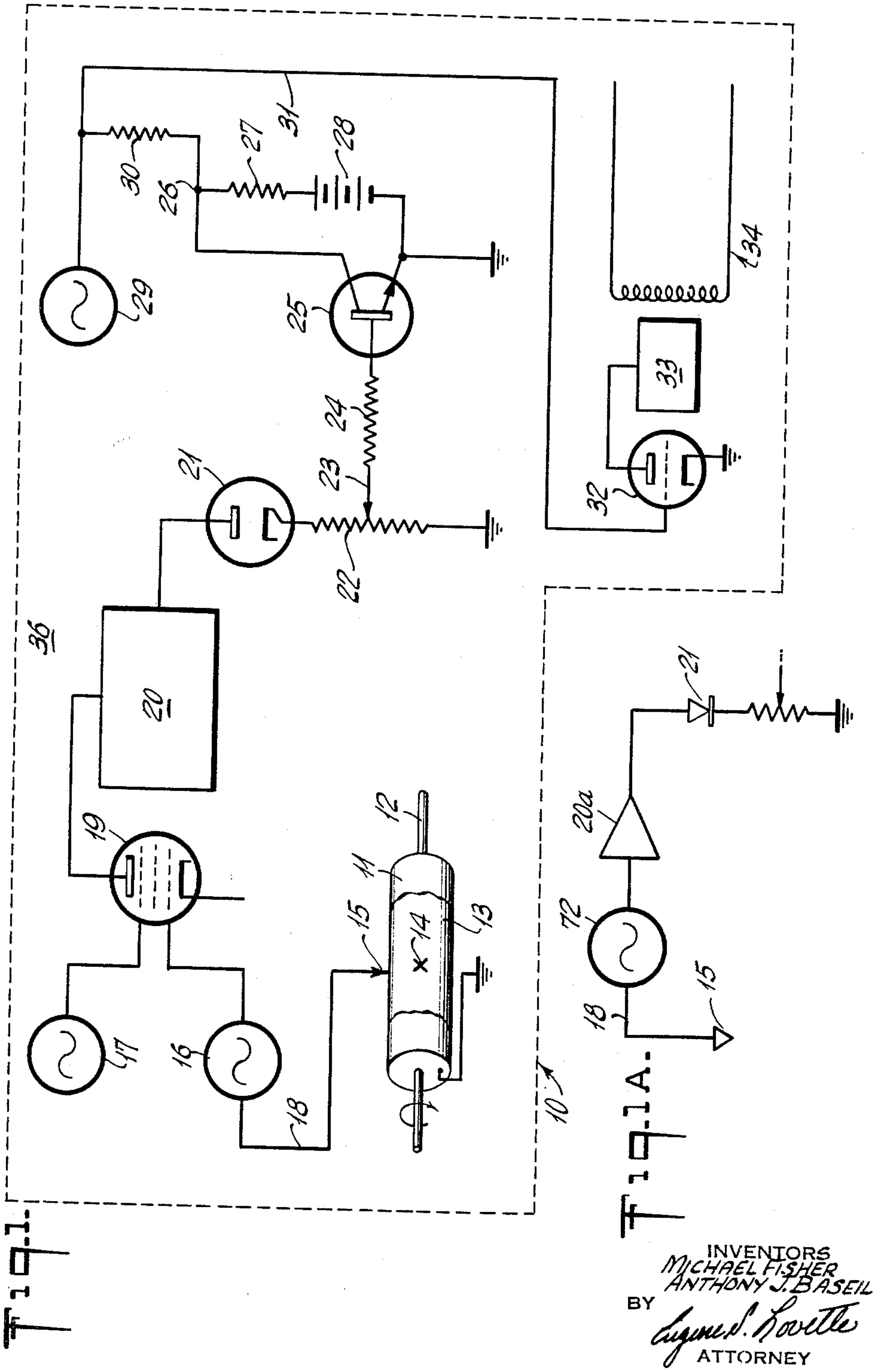
Figure 2:
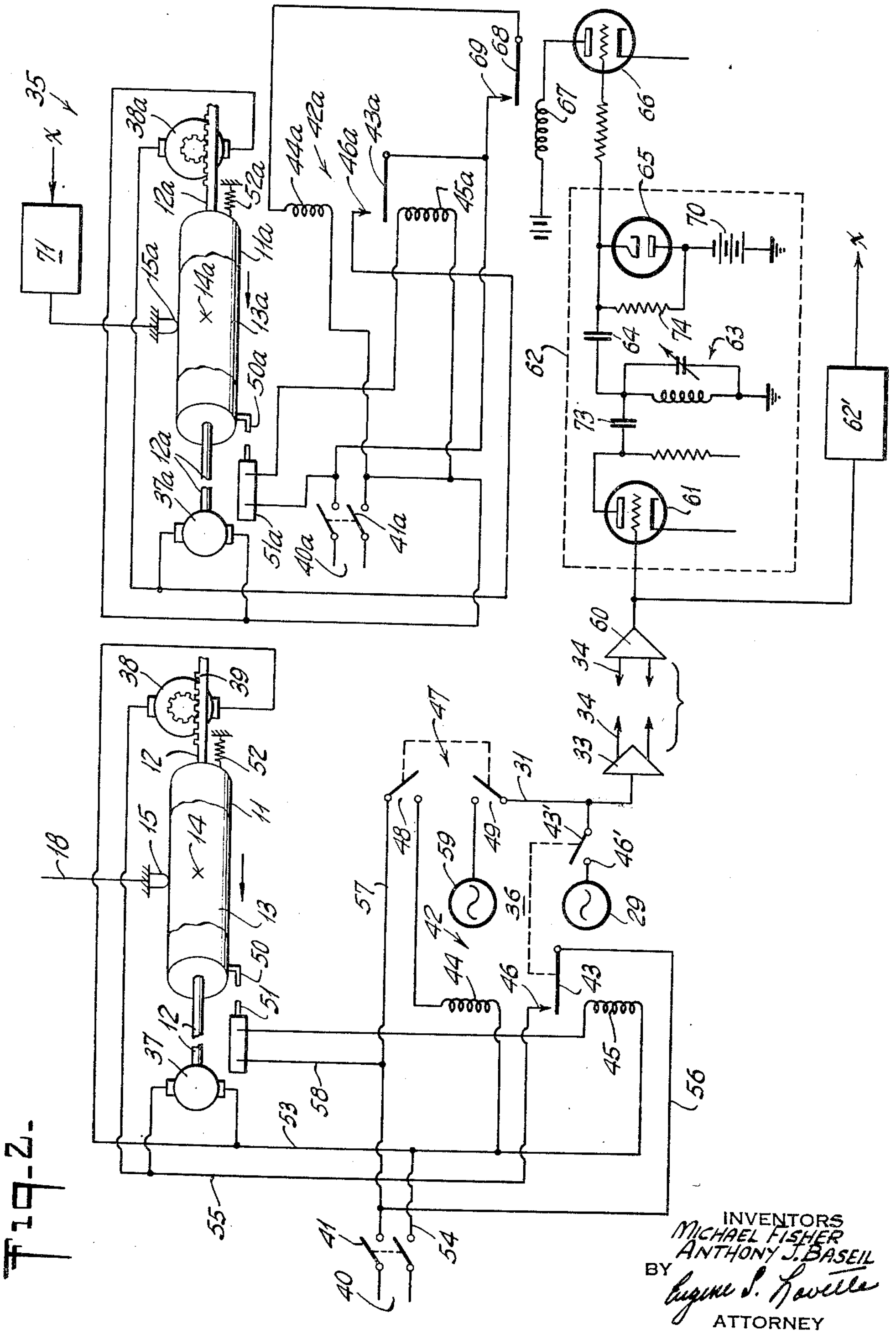

Further objects and advantages will become apparent from the following description of the invention taken in conjunction with the figures, in which:

FIG. 1 depicts schematically circuit portion of the facsimile system in accordance with the invention for sensing pencil or conductive printed copy;

FIG. 1*a* depicts a portion of the circuit of FIG. 1 for illustrating a modified embodiment; and FIG. 2 depicts schematically the portion of the circuit wherein the facsimile drum in the receiver unit is synchronized with similar operation imparted to the facsimile drum in the transmitter unit.

Reference is now made to the schematic illustration of a circuit 10 in accordance with the principles of the invention for sensing a conductive ink or a pencil copy facsimile. Circuit 10 involves a cylindrical drum 11 of conductive material. Drum 11 is adapted to revolve at a uniform r.p.m. about the axis of its shaft 12. Drum 11 is also operated to travel axially, that is to say, lengthwise along the axis of shaft 12 at a constant speed. Drum 11 carries a roll of recording material, such as facsimile paper 13 therewith, on which information 14 has been previously written or printed and which information is being sensed by a conductive stylus 15. Paper 13 is made of electrical insulated material. For the purpose of simplicity of illustration, information 14 on paper 13 is depicted as the letter "X," and paper 13 is shown fragmentary. Stylus 15 is held relatively stationary to contact paper 13 as drum 11 revolves and travels axially. The operation and means for effecting the feed and also the removal of facsimile paper 13 on to and off from drum 11 may be carried out by known and conventional means. The structure shown herein for driving drum 11 to achieve the foregoing operation is depicted diagrammatically, whereby drum 11 rotates and travels axially at a constant speed as stylus 15 senses by contacting the surface of paper 13.

The conductive drum 11 is also grounded as depicted in FIG. 1. For the moment, it will be assumed that record information 14 was made by an electrical conductive ink print and that paper 13 is characterized to absorb the marking ink from its top surface through its thickness to its back surface. The latter paper surface is held in good contact with the drum surface so that the marking ink 14 on paper 13 is also in electrical contact with ground. Consequently, as stylus 15 makes contact with an inked portion of information 14, stylus 15 is effectively grounded. When stylus 15 makes contact with an unmarked portion of paper 13, stylus 15 is electrically isolated from ground because of the insulating characteristics of paper 13. In other words, stylus 15 is rotary connected to ground of the electrical system and otherwise disconnected from ground depending, respectively, whether it is touching information 14 written on the paper surface or not.

The system also employs a pair of radio frequency oscillators 16, 17 of known design. The outputs of oscillators 16, 17 are fed to a pentagrid converter or detector 18 to provide a beat frequency signal. Each oscillator 16, 17 is operated to generate an individual radio frequency signal close to the frequency generated by the other oscillator. Stylus 15 is connected to the tank circuit of oscillator 16 through a lead 18 and the operative connection is such that when stylus 15 is grounded, oscillator 16 is designed not to provide its RF signal. Consequently, when stylus 15 is not grounded, oscillators 16, 17 are generating their individual radio frequency signals, and the difference between these two radio frequencies is designed to fall in the audio frequency range, that is to say, the beat frequency is a relatively low frequency, an audio signal, which is capable of being amplified by a beat frequency amplifier 20. The resultant beat frequency signal from detector 19 is fed to audio amplifier 20. The amplified audio signal is then fed to a diode detector 21 for rectification to produce a D.C. voltage across a load resistor 22 in its output circuit. The low potential side of resistor 22 is grounded. Resistor 22 is an element of a potentiometer which has a wiper arm 23 connected in series with a bias resistor 24 of a transistor D.C. amplifier 25 having a grounded emitter to define a gating circuit. Consequently, when diode 21 is conducting, a D.C. drop occurs across resistor 22 to provide a biasing signal from wiper 23 to ground which causes transistor 25 to conduct. Transistor 25 will not conduct when the D.C. drop across resistor 22 is zero.

The circuit of the system is designed to provide a radio frequency signal to detector 19 when stylus 15 is grounded. This occurs when stylus 15 is momentarily on a portion of conductive ink on drum 11, whereby oscillator 16 is regulated so that it does not provide any RF output for developing a beat frequency. Although a resultant RF signal is impressed on amplifier 20, its output is effectively zero because the beat frequency amplifier 20 is only capable of amplifying the audio beat frequency signal. Hence, the output of amplifier 20 is zero when stylus 15 is on an inked portion of paper 13 with the result that there is no D.C. voltage drop across potentiometer 22 at this moment.

In summary, when conducting ink on drum 11 is being sensed, the output voltage across potentiometer 22 is zero; on the other hand, a voltage will appear across potentiometer 22 when stylus 15 is not sensing any information. Thus far, the system converts the presence or absence of information to an "off-on" D.C. signal.

The transistor collector is connected to a junction 26. Junction 26 is connected to ground through a load resistor 27 and a source of D.C. voltage 28 connected in series and defining the collector-emitter output circuit of D.C. amplifier-gate 25. Junction 26 is also connected to the output circuit of an audio frequency oscillator 29 through a resistor 30 for loading down the output of oscillator 29. Oscillator 29 may be one of known design and oepration. The output of oscillator 29 is also connected by lead 31 to the grid of a triode 32 of a transmission line amplifier 33. Amplifier 33 may be one of known design and operation. The output of amplifier 33 is impressed on to a telephone line 34 for conduction to a receiver unit.

Resistor 30 has a relatively low value of resistance. Consequently, when junction 26 is connected to ground as transistor 25 conducts, the output voltage to amplifier 33 from oscillator 29 is very low or effectively zero because oscillator 29 is loaded down through the low resistance of resistor 30 in series with the conducting transistor to ground. Resistor 27 has a relatively high value of resistance. When transistor 25 is not conducting, oscillator 29 is not loaded down to ground because the series resistors 30 and 27 present a relatively high load to the oscillator output, whereby the oscillator output A.C. audio signal is fed to the grid of triode 32. Accordingly, it is seen that the "on-off" information 14 which has been converted to an "off-on" D.C. signal now appears as an "on-off" audio signal impressed upon transmission line 34.

Circuit operation may be reversed without departing from the principles of the invention with the following respects. Operation of oscillator 16 may be designed to provide an RF signal close to the RF signal produced by oscillator 17 when stylus 15 is grounded to produce the audio beat; and on the other hand, when stylus 15 is isolated from ground, oscillator 16 signal is shifted frequencywise or dampened to render diode non-conducting. This means that when stylus 15 is sensing information, a D.C. drop appears across potentiometer 22, whereby the audio signal from oscillator 29 is shunted into ground; and in the alternate situation, when stylus 15 does not sense any information, the RF signal to amplifier 20 is suppressed with the result that there is no D.C. voltage across potentiometer 22 thereby causing an audio signal from oscillator 29 to be impressed upon line 34. For this mode of operation, the "on-off" of information 14 is converted to an "off-on" audio signal impressed on line 34.

The foregoing principles may be applied to pencil copy information, that is to say, wherein the graphite is sufficiently conductive to permit grounding of stylus 15 whenever information 14 is sensed. It is also within the scope of the invention to employ pencil or ink markings of suitable dielectric or semi-conductive material wherein the operation of oscillator 16 depends upon or is regulated by the capacitance and change of capacitance presented by stylus 15 to the tank circuit of oscillator 16. For example, when stylus 15 is making contact with information 14, a predetermined capacitance will develop between stylus 15 and ground which is presented to the tuned circuit of oscillator 16. On the other hand, when stylus 15 is not making contact with information 14 but with paper 13, a different value of capacitance to ground or practically no value of capacitance to ground is developed. This change of capacitance may be made to regulate the tank circuit of oscillator 16, whereby in one instance its RF signal is frequencywise close to the signal from oscillator 17 to produce the audio beat frequency when the two radio frequencies are mixed. In the other instance, the ground to stylus capacitance will be such that an RF signal is produced upon mixing. In former situation, diode 21 conducts and in the latter, diode 21 does not conduct. The operation of the remainder of the circuit is similar to that described hereinbefore. Other variations are also admissible within the principles of the invention, for example, conductive paper may be used, and the printed information thereon may be made by pencil or ink markings of suitable dielectric or insulated material.

In addition, a single audio frequency oscillator 72, see modification of FIG. 1*a*, may be used in lieu of the pair of RF oscillators 16 and 17 when conductive paper 13 and dielectric or insulated material markings 14 are used in one arrangement of the invention, or when conductive markings 14 and dielectric or insulated paper 13 is used as the other arrangement of operation. In the use of a single audio frequency oscillator 72 in place of RF oscillators 16, 17, the conductive stylus 15 is coupled to the oscillator circuit to short same out when stylus 15 is grounded, whereby oscillator 72 does not provide any output to the detector-beat frequency amplifier, depicted as 20*a* in FIG. 1*a*, in which case diode 21 does not conduct whereby an "on" audio frequency output signal from oscillator 29 is fed to transmission line 34. On the other hand, when stylus 15 is not grounded, audio frequency oscillator 72 provides an audio frequency signal to detector-amplifier 20*a*, whereby diode 21 conducts and the output from oscillator 29 is shunted to ground by the transistor loading circuit to provide an "off" signal to line 34. The circuit of FIG. 1*a* is otherwise the same as that of FIG. 1.

FIG. 2 illustrates schematically the means for synchronizing rotation and axial travel of a cylindrical facsimile drum 11*a* in the receiver unit 35 with rotation axial travel of drum 11 in the transmitter unit 36. Elements of the receiver unit shown in FIG. 2 that correspond to like elements in the transmitter unit are designated by like reference numbers followed by small case letters. Drum 11*a* carries paper 13*a* which is adapted to be marked by a stylus 15*a* when the latter is actuated in accordance with the "on-off" signals received from transmitter unit 36 as described with reference to FIG. 1, whereby the same information on drum 11 is reproduced on paper 13*a*. Drum 11*a* and stylus 15*a* need not be made of conductive material. It will be understood that receiver unit 35 may be located or separated a far distance from transmitter unit 36 and the connection between the two is effected by telephone line 34. Drum 11 in transmitter unit 36 is rotated by a synchronous motor 37, and is driven along the lengthwise dimension of the axis of shaft 12 by a synchronous motor 38 through a worm gear train 39. Drum 11 will travel from its extreme right position to its extreme left position as it rotates while paper 13 is being sensed by stylus 15. When drum 11 reaches its left most position, it will have covered a full course of copy, consequently drum 11 is then returned to its starting position in preparation for sensing the next course of information. Synchronous motors 37*a*, 38*a* serve to impart corresponding motion to drum 11*a* in receiver unit 35. Motors 37, 38 and 37*a*, 38*a* are energized by synchronized power sources 40, 40*a*, such as the 60 cycle Edison supplies, at their respective locations in a manner to be described hereinafter.

When transmission of information from transmitter unit 36 to a particular receiver unit 37 as depicted in FIG. 2 is contemplated, the line switches 41, 41*a* at the stations are closed to connect the respective units to the individual Edison supplies. Transmitter unit 36 has a double throw hold relay 42 which includes a switching blade 43. Blade 43 responds to energization of its individual coils 44, 45. When upper coil 44 is energized, blade 43 pivots up to make electrical connection with relay contact 46. This contact connection remains closed until lower relay coil 45 is energized which drives blade 43 to its open contact position. Hence, it will be understood that relay 42 closes its switch connection upon actuation by a first signal and that this switch connection remains closed until actuated by a second signal to coil 45 wherein its switch connection opens and remains open until relay 42 is actuated by a third signal to coil 44 which closes its switch connection, and so on. The same operation applies to the double throw hold relay 42*a* in receiver unit 35.

After switches 41, 41*a* are closed, an operator at the transmitter unit closes a double pole single throw switch 47, which action closes its pair of contacts 48, 49. Switch 47 need be closed only for a moment. The closed contact 48 provides a starting impulse to flow through upper relay coil 44 which causes blade connection with contact 46, and as noted hereinbefore, this connection remains latched closed until lower relay coil 45 is later energized to unlatch blade 43. When the connection to relay contact 46 is made, synchronous motors 37, 38 are energized by the same source of voltage 40 whereby motor 37 causes drum 11 to rotate at a specified and constant r.p.m. as motor 38 causes drum 11 to travel from the right to the left also at a specified and constant speed. When drum 11 reaches its left position, stylus 15 will have covered a complete course of information 14, hence a cam operator 50 carried by drum 11 at this time will actuate a normally open switch 51 to close same. Lower relay coil 45 is momentarily energized when switch 51 is closed to unlatch or open the contact connection of relay 42. This action de-energizes synchronous motors 37, 38 whereby drum 11 is withdrawn to its right hand or starting position under the force of return spring means 52. As the foregoing action takes place, the same action is also occurring in receiver unit 35. For example, when drum 11*a* reaches its left hand position, a cam operator 50*a* actuates normally opened switch 51*a* to cause an impulse to be sent through lower relay coil 45*a*, which opens relay contact 46*a* to allow drum 11*a* to be returned to its right hand starting position under the force of return spring means 52*a*. By the time drums 11, 11*a* have reached their respective left hand positions, stylus 15 will have sensed a complete copy of information 14 on the paper on drum 11, whereas stylus 15*a* will have reproduced the same message on the paper on drum 11*a*.

To effect the foregoing operation in the electrical circuit of FIG. 2, it will be noted that synchronous motors 37, 38 are electrically in parallel and one side of each motor is connected to one side of supply 40 through leads 53, 54. The other side of each motor 37, 38 is connected to the other side of supply 40 through lead 55, relay 42 and lead 56. The upper blade of switch 47 is connected to one side of supply 40 through lead 57, and its contact terminal 48 is connected to the other side of supply 40 through upper relay coil 44 and lead 53. Normally open switch 51 is connected to one side of supply 40 through leads 57, 58 and to the other side of supply 40 through the lower relay coil 45 and lead 53. Similar electrical circuit conditions obtain in receiver unit 35.

When switch 47 was closed momentarily at the start of operation, its lower blade closes contact 49 to connect the output of a tone frequency generator 59 to line amplifier 33, whereby this signal is amplified and impressed over line 34 and received by a receiver audio amplifier 60 which in turn amplifies the tone signal and feeds same to the grid of an amplifier triode 61 of a selector network depicted as 62. The signal impressed on tube 61 is fed through a capacitor 73 to a high "Q" toroid tone selector circuit, that is to say, a parallel resonant circuit 63 which is tuned to resonate exactly at the selected frequency provided by tone frequency generator 59. Hence, when the signals impressed upon amplifier 60 include the tone frequency signal, a very high voltage signal of such frequency appears across resonant circuit 63. On the other hand, if the signals received by amplifier 60 from line 34 lack the selected tone frequency signal, the voltage across parallel resonant circuit 63 is at most very small. Receiver amplifier 60 amplifies all the signals transmitted by line 34 including noise and other interference. However, parallel resonant circuit 63 eliminates all these signals except the tone frequency signal because it is tuned to such frequency. Hence, selector network 62 impresses an output voltage through capacitor 64 across a rectifier 65 to cause the latter to conduct only when the selected tone frequency is impressed on network 62. When rectifier 65 conducts, it regulates the original D.C. bias voltage on the grid of a relay tube 66 with the result that tube 66 conducts, whereby a plate current flows through the coil 67 of a relay. Energization of relay coil 67 moves its relay blade 68 to close connection with its contact 69. A negative D.C. source 70 biases diode 65 and also tube 66 through a resistor 74 so that diode 65 does not conduct unless the high voltage A.C. tone signal appears across resonant circuit 63. Consequently, it is seen that closing of switch 47 causes a momentary impression of the specified tone signal to circuit 62, whereby relay 67—69 momentarily closes its contact 69. Relay 67—69 is essentially the equivalent of switch contact 47—48 and when closed connection is made with contact 69, it sends an energizing pulse through upper relay coil 44*a* thereby actuating blade 43*a* to close its contact 46*a* with the result that motors 37*a*, 38*a* are each energized substantially simultaneously with energization of motors 37 and 38. Since the information on drum 11 is to be reproduced on drum 11*a*, the two drums should rotate and travel, respectively, at the same r.p.m. and axial speed and that such action should be synchronized. Consequently, motors 37*a*, 38*a* are designed to operate drum 11*a* at the same constant r.p.m. and axial speeds selected for drum 11. As noted hereinbefore, operation of both drums started substantially at the same time, and since drums 11 and 11*a* are travelling at the same rate, they reach their respective end positions and actuate switches 51, 51*a* at the same time whereby they both return to their starting positions substantially simultaneously. Consequently, it is seen by the foregoing circuit that operation of drums 11 and 11*a* is substantially synchronized throughout the cycle of operation.

The circuit illustrated herein provides means to control or maintain drums 11, 11*a* in synchronized operation despite the fact they may be located far distances apart. It will be expected that the two drums 11, 11*a* may not start operation exactly at the same time because some delay will be attributed to transmission of the start operation tone signal over transmission line 34. However, since the reproduced information 14*a* also travels over the same telephone line 34, the same time delay is encountered as this information is being impressed upon receiver unit 35. Consequently, the reproduced copy 14*a* at the receiver unit will be substantially identical with the information 14 at the transmitter. Drums 11, 11*a* are cylindrical. Consequently, as long as both drums 11, 11*a* are synchronized as to rotation, axial speed and position, the reproduced picture on drum 11*a* will be the same as the original on drum 11, even if drum 11*a* is off at least one-quarter of a revolution with respect to drum 11.

FIG. 2 also depicts audio oscillator 29 and its connection through switch 43′—46′ to line 31 for impressing its "on-off" A.C. signal over telephone line 34 to the receiver unit 35. Switch blade 43′ may be ganged to switch blade 43 so that blade 43′ closes and opens with the action of blade 43, whereby contact 46′ is simultaneously closed and opened. The A.C. signal from oscillator 29 is not the same frequency as the tone frequency signal, hence the signal from oscillator 29 will be rejected by selector 62. Consequently, this A.C. signal after being amplified by amplifier 60 is sent to a selector 62′ which may be of similar design as selector 62. The output from selector 62′ is impressed upon a stylus actuator operator 71, whereby stylus 15a is operated to mark paper 13a in accordance with the "on-off" audio signal sensed by selector 62′. Actuator 71 may be of any conventional and known design for effecting operation of stylus 15a.

It is intended that all matter contained in the above description or shown in the accompanying drawings shall be interpreted as illustrative and not in a limiting sense.

What is claimed is:

1. In apparatus for transmitting facsimile information through a transmission line to remotely located receiver means, the combination comprising, conductive means connected to the system ground, facsimile means having a copy of the printed information to be transmitted, said facsimile means being relatively electrically insulated, the printed information being relatively conductive and contiguous with said conductive means, a conductive stylus for tracing over said facsimile means for sensing the printed information thereon, oscillator means coupled to said stylus for responding to signals provided by said stylus as the latter traces over said facsimile means, said oscillator means being characterized to provide signals of first or second frequencies in accordance whether said stylus is sensing a printed portion of said information or not, means responsive to said first frequency signal for providing an amplified output, gating means providing first and second signals in accordance with the presence and absence of said last-mentioned amplified output signal, an audio oscillator for providing an audio frequency signal and having an output circuit, and means responsive to said gating signals for loading said audio oscillator output circuit, whereby "on and off" audio signals are impressed on said transmission line in accordance with one or the other of said first-mentioned first and second signals, said "on and off" audio signals corresponding to the presence and the absence of printed information being sensed by said stylus.

2. Apparatus as defined in claim 1, said loading means including, transistor means having a collector and also having a grounded emitter, a resistor of relatively high resistance value in series with a direct current source in the collector emitter circuit of said transistor, said audio frequency oscillator output circuit being coupled to the series connected resistor and D.C. source through a resistor of relatively low resistance wherein the output circuit of said audio frequency oscillator is loaded down to ground through the transistor when said transistor conducts in response to one of said gating signals, said transistor not conducting in response to the other gating signal, whereby said resistors provide a relatively high load to said audio frequency oscillator, thereby permitting the audio frequency output to be impressed upon said transmission line.

3. In apparatus as defined in claim 1, said oscillator means including a pair of oscillators for generating individual output signals, said stylus being coupled to one oscillator of said pair for regulating its output signal, detector means responsive to said pair of oscillators for mixing the output signals thereof to provide the individual first or second frequency signals in accordance with whether said stylus is sensing a printed portion of said information or not, one signal of said first and second frequency signals being an audio beat frequency.

4. In apparatus as defined in claim 3, said stylus being relatively grounded when in contact with a printed portion of said information and otherwise being relatively isolated from ground for regulating the output frequency signal of the oscillator to which said stylus is coupled.

5. Apparatus as defined in claim 4, said stylus loading the oscillator to which it is coupled with a first value of capacitance when said stylus is in contact with a printed portion of said information and otherwise loading said oscillator to which it is coupled with a different value of capacitance for regulating the output frequency signal of such oscillator.

6. In apparatus for transmitting facsimile information from a transmitter unit to a remotely located receiver unit, the combination comprising, first and second cylindrical drums at the transmitter and receiver units respectively, stylus means operatively associated with the transmitter drum for sensing printed information thereon which information is to be transmitted to said receiver unit and reproduced thereat, stylus means operatively associated with said receiver drum for recording a copy of said printed information on said receiver drum, synchronous motor means at said transmitter unit and also at said receiver unit for rotating the individual drums thereof and also for imparting axial travel to said individual drums, said motor means being characterized to rotate said transmitter and receiver drums at the same uniform r.p.m. and to impart axial travel of the same uniform speed to said drums, electrical source means at said transmitter and receiver units for energizing the respective motor means, relay switch means at said transmitter unit for connecting said transmitter motors to said transmitter source in response to a first trigger impulse whereby movement of said transmitter drum from a start position is initiated, said relay switch means being characterized to latch and hold said transmitter motors energized whereby said transmitter drum is rotated and also driven axially from said start position to a second position while said stylus is sensing a complete copy of printed information on said drum, a trigger operator carried by said drum, switch means coupled to said relay switch means, said switch means being actuated by said operation when said transmitter drum reaches its second position for impressing a second trigger impulse on said relay switch means, said relay switch means responding to said second trigger impulse by de-energizing said transmitter motors to stop operation of such motor means, means acting upon said transmitter drum for returning said drum to its start position after said transmitter motors are de-energized in preparation for actuating said drum for sensing the next complete course of printed copy, relay switch means at said receiver unit for connecting said receiver motors to said receiver source in response to a first trigger impulse whereby movement of said receiver drum from a start position is initiated, said second relay switch means being characterized to latch and hold said receiver motor means energized whereby said receiver drum is rotated and also driven axially from its start position to a second position while its operatively associated stylus is recording on said receiver drum a copy of the aforesaid information sensed by said transmitter stylus, a tone generator for providing a selected tone frequency signal, a transmission line for connecting said transmitter and receiver units, means for applying said first trigger impulse to said transmitter relay switch means and also for impressing said tone frequency signal on said transmission line, frequency selector means at said receiver unit for providing an output signal in response to detection of said tone frequency signal, third switch means at said receiver unit and responsive to said selector means output for applying a first trigger impulse to said second relay switch means, whereby said receiver motor means initiate rotation and axial travel of said receiver drum in synchronism with like movement of said transmitter drum, a second trigger operator carried by said receiver drum, second switch means coupled to said second relay switch means, said second relay switch means being actuated by said second operator when said receiver drum reaches its second position for impressing a second trigger impulse on said second relay switch means, said second relay switch means responding to said second trigger impulse by de-energizing said receiver motor means to stop operation of such motor means substantially in synchronism with like stopping of said transmitter motor means, and means acting upon said receiver drum for returning such drum to its starting position after said receiver motor means are de-energized in preparation of actuation of said receiver drum for recording of the next complete course of printed copy, return of said receiver drum to its starting position being substantially synchronized with like movement of said transmitter drum.

7. In apparatus for transmitting facsimile information from a transmitter unit to a remotely located receiver unit, the combination comprising, first and second cylindrical drums at the transmitter and receiver units respectively, first and second stylus means, the first stylus means being operatively associated with the transmitter drum for sensing printed information thereon which information is to be transmitted to said receiver unit and reproduced thereat, the second stylus means operatively associated with said received drum for recording on said receiver drum a copy of said printed information, first and second synchronous motor means respectively at said transmitter and receiver units for rotating the individual drums at the same r.p.m. and also for imparting axial travel to said individual drums with the same uniform speed, first and second relay switch means at said transmitter and receiver units respectively for energizing the respective motor means thereat in synchronized relationship whereby the individual drums undergo rotation and also undergo axial travel from respective starting positions at the same time and complete the foregoing motion at the same time, means acting on each drum for returning the individual drums to their starting positions, movement of the transmitter drum from its starting position to a second position occurring while its stylus senses a complete copy of printed information thereon and similar motion of said receiver drum occurring as its stylus is recording a copy of such information thereon, a tone generator for providing a specified tone frequency signal, a transmission line for connecting said transmitter and receiver units, means for actuating said transmitter relay switch means for starting said transmitter motor means and also for impressing said tone frequency signal on said line for transmission to said receiver unit, selector means at said receiver unit for providing an output signal in response to detecting said tone frequency signal, means at said receiver unit responsive to said selector means output signal for triggering said receiver relay switch means for energizing said receiver motor, whereby said receiver motor initiates rotation and travel of said receiver drum in synchronism with like movement of said transmitter drum.

8. Apparatus as defined in claim 7 wherein, said transmitter drum is relatively electrically conductive and connected to the system ground, facsimile means carried by said drum and being relatively electrically insulated and having the printed information thereon which information is made of relatively conductive markings contiguous with said conductive drum, said transmitter stylus being conductive, oscillator means coupled to said transmitter stylus for responding to signals provided by said transmitter stylus as the latter traces over said facsimile means, said oscillator means being characterized to provide signals of first or second frequencies in accordance with whether said stylus is sensing a printed portion of said information or not, means responsive to the first frequency signal for providing an amplified output, gating means for providing first and second signals in accordance with the presence and absence of said last-mentioned amplified output signals, an audio oscillator coupled to said line for providing an audio frequency signal and having an output circuit, means responsive to said gating signals for loading said audio oscillator output circuit whereby "on and off" audio signals are impressed on said transmission line in accordance with one or the other of said first-mentioned first and second signals, said one and off audio signals corresponding to the presence and absence of printed information being sensed by said transmitter stylus, and means in said receiver unit for converting said on and off audio signals and for regulating said receiver stylus in accordance with said on and off audio signals for reproducing a copy of the printed information on said receiver drum.

References Cited in the file of this patent

UNITED STATES PATENTS

| | | |
|---|---|---|
| 1,290,957 | Foss et al. | Jan. 14, 1919 |
| 2,047,817 | Bailey | July 14, 1936 |
| 2,255,868 | Wise et al. | Sept. 16, 1941 |
| 2,640,874 | McConnell et al. | June 2, 1953 |